United States Patent
Rosenweig et al.

(10) Patent No.: US 6,188,991 B1
(45) Date of Patent: Feb. 13, 2001

(54) INVENTORY CONTROL SYSTEM

(75) Inventors: Michael Rosenweig, Hillsboro; Rezaur Rahman, Beaverton, both of OR (US)

(73) Assignee: Intel Corporation, Santa Clara, CA (US)

( * ) Notice: Under 35 U.S.C. 154(b), the term of this patent shall be extended for 0 days.

(21) Appl. No.: 09/071,559

(22) Filed: May 1, 1998

(51) Int. Cl.[7] ............................................... G06F 17/60
(52) U.S. Cl. ............................ 705/29; 340/568; 700/214; 705/28
(58) Field of Search ................................. 235/383, 385; 340/568; 377/6, 13; 700/213, 214; 705/1, 22, 28, 29

(56) References Cited

U.S. PATENT DOCUMENTS

| | | | |
|---|---|---|---|
| Re. 25,600 | * 6/1964 | Goldwater et al. | 377/13 X |
| 4,071,740 | * 1/1978 | Gogulski | 235/431 |
| 5,404,384 | * 4/1995 | Colburn et al. | 377/6 |
| 5,482,139 | * 1/1996 | Rivalto et al. | 186/36 |
| 5,533,079 | * 7/1996 | Colburn et al. | 377/6 |
| 5,777,884 | * 7/1998 | Belka et al. | 700/225 |

* cited by examiner

Primary Examiner—Edward R. Cosimano
(74) Attorney, Agent, or Firm—Trop, Pruner, Hu & Miles, P.C.

(57) ABSTRACT

An inventory control system includes a computer system which may be coupled to a bar code scanner to allow items added to the inventory or deleted from the inventory to be scanned. The scanner may be mounted on an inventory storage container to facilitate inventory control. When the inventory of a particular item falls below a given level, an indication can be provided to assist in inventory control. A given list of items can be compared to the available inventory to determine whether the list of items is available. In addition, the inventory can be compared to a plurality of such lists to determine which lists are available in inventory.

15 Claims, 5 Drawing Sheets

INVENTORY CONTROL SYSTEM

BACKGROUND

This invention relates generally to controlling an inventory of items using computers.

Various techniques exist for providing computerized inventories. For example, bar code scanners may be used to scan bar code labels on items to maintain an inventory of items. Separate bar code scanners may thereafter be used to record when an item has left the inventory. For example, in supermarkets, bar code labels are provided on food items which can be scanned by a bar code reader. At the checkout counter, the items are scanned for pricing purposes. The scanned information could be used to provide inventory information.

There are a number of applications where maintaining an inventory is of considerable importance. In homes, it may be desirable to maintain an inventory of food supplies and particularly to keep minimum levels of certain food items. In an office setting it may be desirable to maintain a given supply of office supplies such as pencils, pens, paper and the like. In a manufacturing operation, it may be necessary to maintain a given supply of parts to enable the assembly line to continue to operate. In all these cases and others, the control of inventory may facilitate the completion of tasks. However maintaining an inventory may be made more complex because various people may have access to the inventory storage facility and therefore no one person may be aware of what is the current inventory.

Thus there is a need for techniques for allowing better control of the inventory maintained at storage locations and accessed by multiple users.

SUMMARY

In accordance with one aspect, a method of controlling inventory includes adding new items to an inventory. Used items are deleted from the inventory. An indication is provided when the inventory reaches a predetermined level.

DETAILED DESCRIPTION

Figure 1:
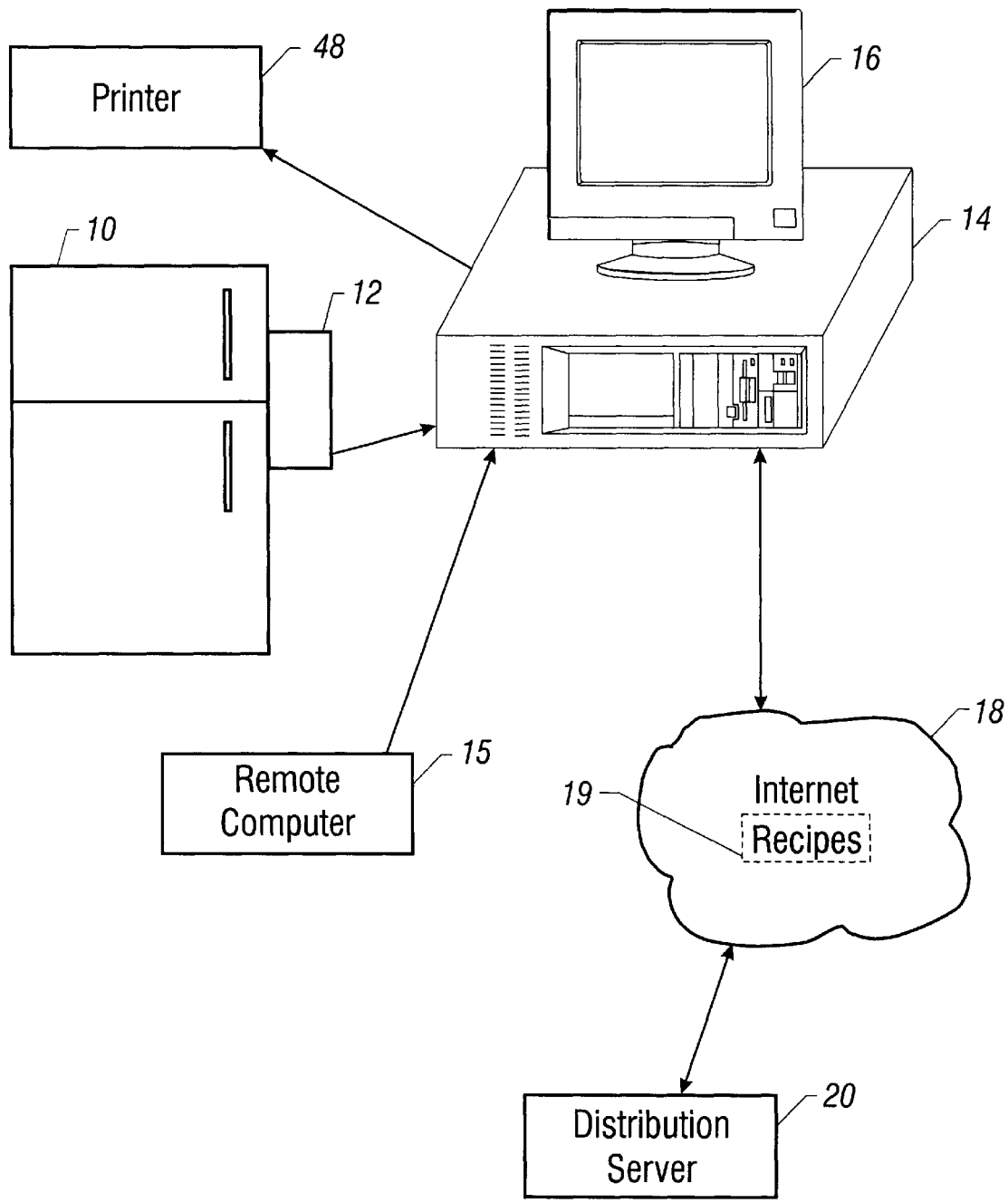
FIG. 1 is a schematic depiction of one embodiment of the present invention.

Referring to FIG. 1, a system for controlling inventory includes a computer 14. As used herein, the term "inventory" is intended to refer to a given supply of items. A "list" is intended to refer to a collection of items (generally less than the entire inventory) that may be necessary for a given task.

As an aid in illustrating the present invention, the simple example of a refrigerator may be utilized to better understand the principles involved. Of course it should be appreciated that the refrigerator could be any storage location which maintains a supply of items in inventory. The food items are the inventoried items. Recipes may be an example of one form of list in the context of a food storage system. Other examples of lists would include the parts that go into making a given product or the supplies which are necessary to run a given office.

As shown in FIG. 1, a storage facility illustrated as a refrigerator 10 maintains an inventory of items which typically would be foodstuffs. A bar code scanner 12 is mounted on the refrigerator so that items may be scanned when they are added to or taken from the refrigerator. Each of the items can include an appropriate bar coded label. When a new item is scanned by the scanner 12, it is added to the inventory. When an item is scanned that is already on the inventory, the system presumes that the item has been removed and the item is likewise removed from the inventory. In many cases there may be multiple items of the same general type. Inventories may include sub-inventories of similar products. Thus, continuing the food example, the refrigerator could include a number of oranges, tallied in a sub-inventory giving the number of oranges which is part of a larger inventory of foodstuffs. The scanner 12 may be connected to a personal computer system 14. The system 14 may be coupled to a display which may be a monitor 16 and a printer 48.

The computer 14 may interact with other locations through a dial-in connection with a remote computer 15. Similarly, the computer 14 can access the internet 18 and may communicate with a distribution server 20 through the internet. If the inventory is maintained on the computer 14, the user can access the inventory from a remote computer 15. Again referring to the food illustration, the user can dial into the computer system 14 to determine the current status of the inventory. Based on that information, the user could decide what to have for dinner or whether it is necessary to stop by the supermarket to replenish the inventory. Likewise, when it is necessary to obtain additional items, the computer can dial-up the internet 18 and order additional items from a distribution server. Those items could be delivered by the distributor as needed.

It is also possible to access recipes (or other lists) stored on the computer 14. The recipes 19 may consist of lists of items. In the food illustration, the recipes simply amount to the food items necessary to make a given dish. Thus, the user can consult the recipes on the computer system 14 or additional recipes 19 on the internet 18. In this way, the user can compare the compiled inventory with given lists of items that may be of interest. Again referring to the foodstuff example, the inventory can be compared to recipes stored in the computer system 14 or available on the internet 18 to determine if the available foodstuffs are sufficient to enable a given recipe to made. Similarly, the recipes of interest can be compared to the inventory to determine whether there are recipes that can be made with the given inventory.

Figure 2:
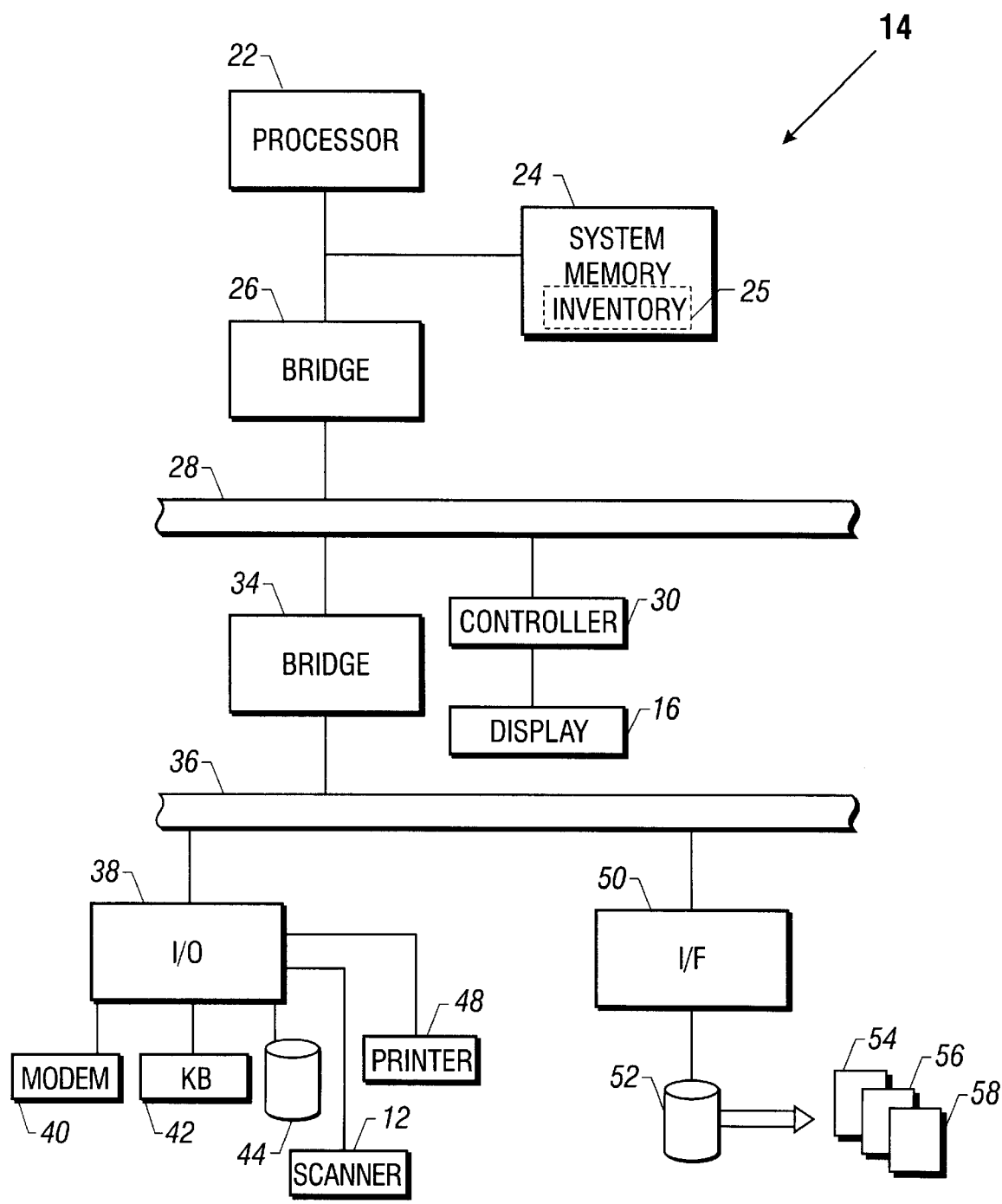
FIG. 2 is a block diagram of the computer system shown in FIG. 1.

Referring now to FIG. 2, the computer system 14 includes a processor 22 connected to system memory 24. The inventory 25 may be maintained in system memory 24. The processor is coupled to a bus 28 by a bridge 26. The bus 28 may support a controller 30 for the display 16. The bus 28 may also connect to a bridge 34.

The bridge 34 may connect to a bus 36 which connects to an input/output (I/O) interface 38 and an interface 50 for a hard disk drive 52. The hard disk drive 52 supports software programs 54, 56 and 58.

The I/O interface 38 may connect to a modem 40 to facilitate communication with a remote computer 15 over the internet 18. The interface 38 may also communicate with a keyboard 42 and a floppy drive 44. Likewise, the scanner 12 may connect to the remainder of the computer system through the I/O interface 38. Finally, a printer 48 may connect to the parallel port of the interface 38.

Figure 3:
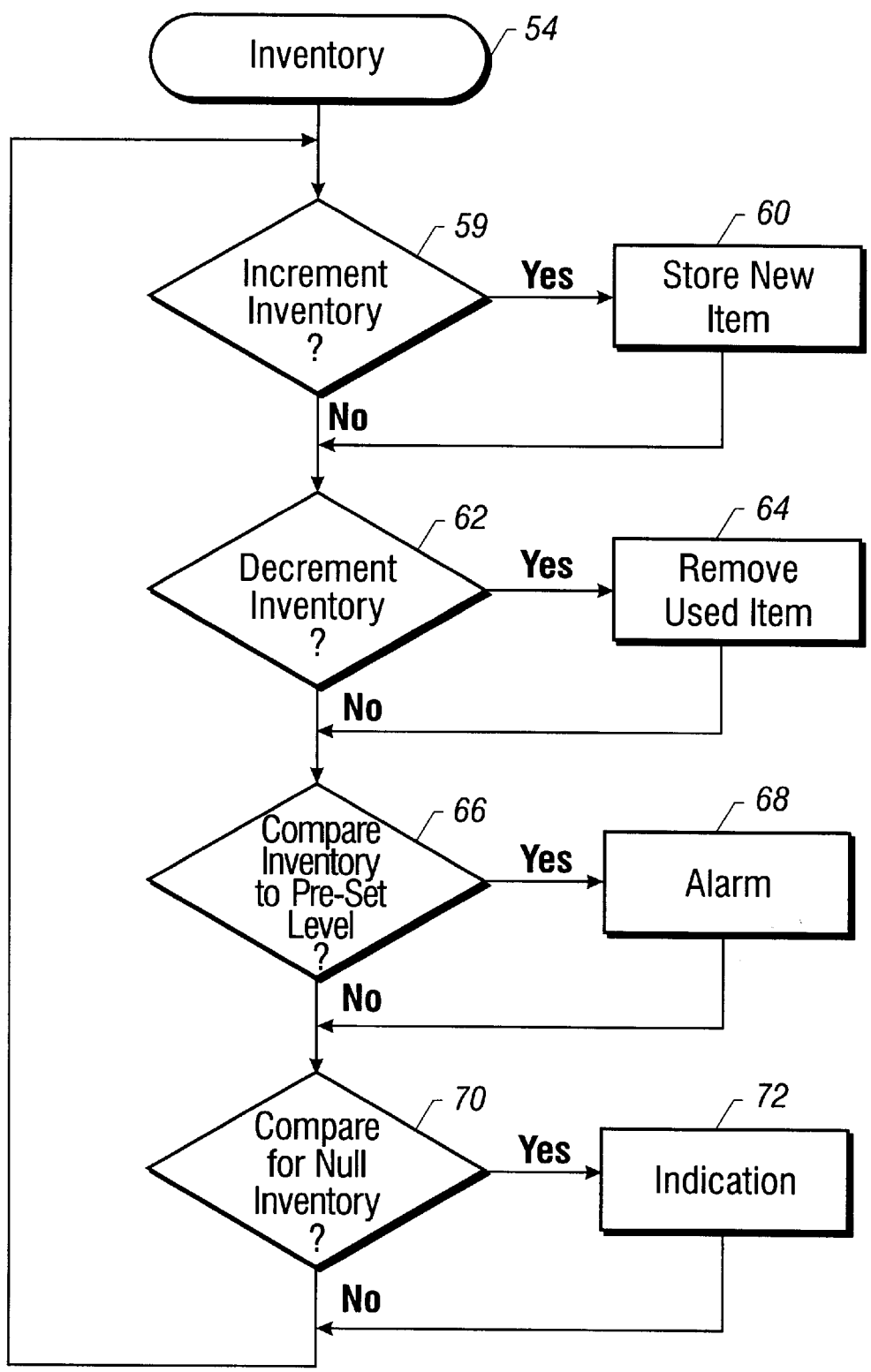
FIG. 3 is a flow diagram for one embodiment of the present invention.

Referring now to FIG. 3, the operation of the program 54 which may be stored on the hard disk drive 52 is illustrated. Program 54 is an inventory program which compiles the inventory, and provides an indication when a predetermined inventory level has been reached.

Initially a check is made to determine whether to increment the inventory at diamond 59. If an additional item has been added and scanned by the scanner 12, the new item is added to the inventory as indicated at block 60. After the new item is added at block 60 or if inventory is not incremented at diamond 59, a check is made at diamond 62 to determine whether it is necessary to decrement the inventory. If an item has been removed from the inventory, as indicated at block 64, the item is decremented from the inventory. Again, the computer system 14 may assume that when a new item is read, it is being added to the inventory and when an existing item is read by the scanner it is being used and removed from the inventory.

After an item is removed at block 64 or the check for decrementing inventory at diamond 62 is negative, a comparison is made between the inventory and a preset inventory level (diamond 66). This comparison can be on an inventory as a whole basis or with respect to sub-inventories within the given inventory. For example, when the number of oranges in an orange sub-inventory drops below a desired level an alarm may be issued as indicated at block 68. After comparing inventory at diamond 66 or issuing an alarm at block 68, a comparison is made, as indicated at block 70 for a null inventory. A null inventory condition would exist when a given supply of items is completely exhausted. When this occurs, an indication is provided as indicated at block 72. Otherwise the flow cycles back to the beginning and iterates through the same steps. The flow also cycles back to the beginning after block 72.

Figure 4:
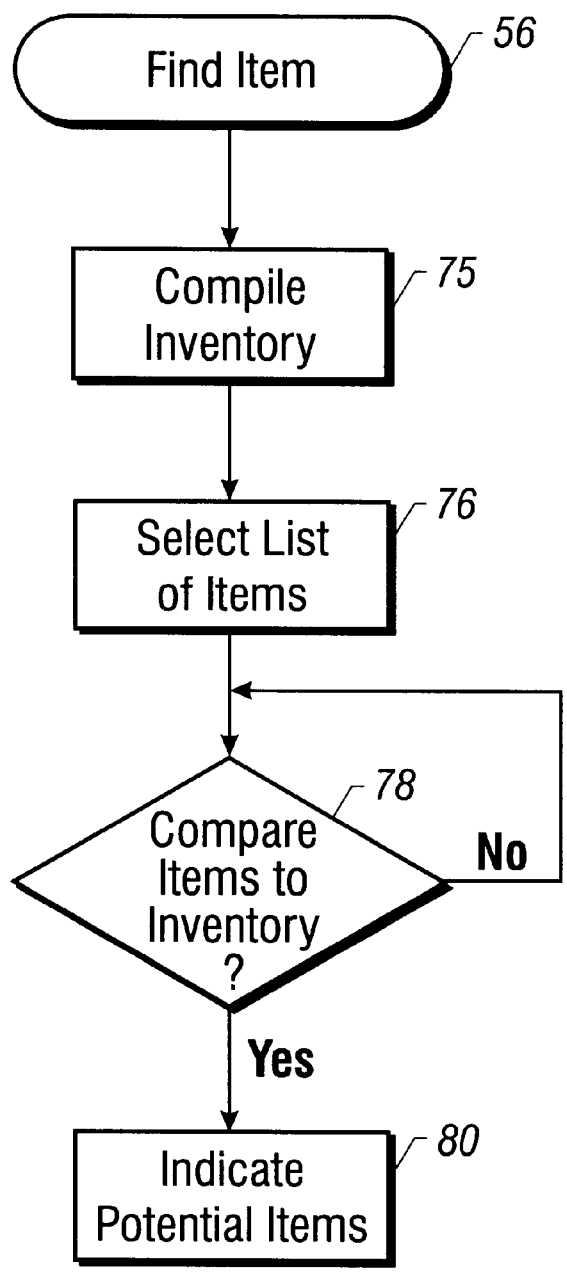
FIG. 4 is a flow diagram of another embodiment of the present invention.

Referring now to FIG. 4, a find item program 56 is illustrated. This is useful in determining whether a given list of items is available in inventory. Again the list could correspond to a recipe which requires a number of items in given amounts in order to complete the recipe. It could also correspond to a parts list which is necessary to manufacture a given product. At block 75, an inventory of relevant items is compiled. At block 76, a list of items is selected. The items in the selected list are then compared to the inventory as indicated at diamond 78. Next at block 80, an indication is provided of those lists which are made up of items that in fact are present in the inventory.

For example, in the foodstuff context, the list could be a given recipe. The comparison compares the list of items on the recipe to the inventory to determine whether sufficient quantity of the necessary items exist in inventory.

Figure 5:
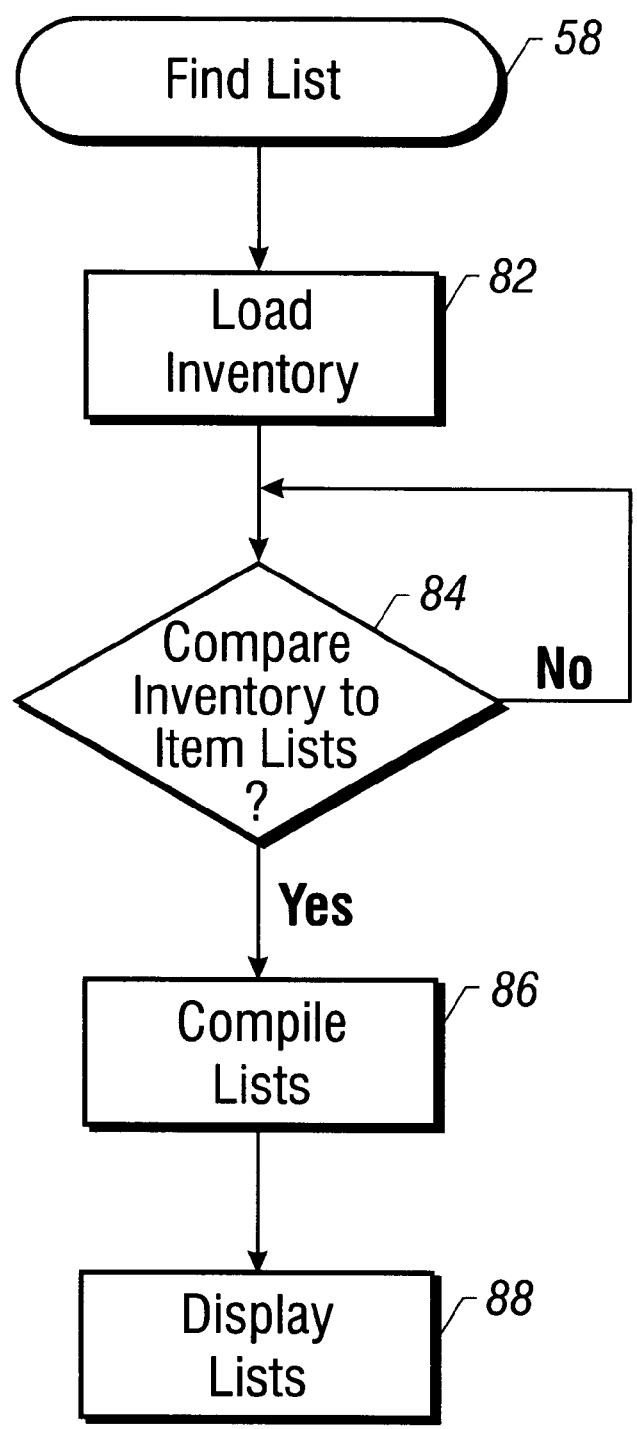
FIG. 5 is a flow diagram of still another embodiment of the present invention.

Referring now to FIG. 5, the program 58 called find list is illustrated. This program is useful in comparing the inventory to item lists to determine if any of the lists in a group of lists can be satisfied from the existing inventory. Initially the inventory is prepared, loaded or compiled as indicated at block 82. At diamond 84 a comparison of the inventory to a given set of item lists is accomplished. If a list is not satisfied by the existing inventory, the program iterates until a suitable list which is in stock is located. Once this is accomplished, the list is added to a grouping of lists which are satisfied by inventory as indicated at block 86. The satisfying lists are then displayed as indicated at block 88.

Using embodiments of the present invention, a user is able to maintain an inventory and is notified when the inventory reaches predetermined high or low levels. In this way, the user is able to control the inventory and restock as necessary. The inventory may be accessed remotely so that even when the user is not on site, the user can obtain information about the inventory suitable for planning purposes. Likewise, a list may be obtained either from the computer's memory or from the internet which then can be compared to the inventory to determine whether or not the list can be satisfied by the given inventory. Similarly, groups of lists of items can be compared to items in inventory to determine whether any of the lists would be satisfied by the existing inventory. Thus, one could, for example, determine which recipes would be prepared given the present inventory.

While the present invention has been described with respect to a limited number of embodiments, those skilled in the art will appreciate numerous modifications and variations therefrom. It is intended that the appended claims cover all such modifications and variations that fall within the true scope of the present invention.

What is claimed is:

1. A method of providing a set of producible products comprising:
   preparing an inventory of items on a computer;
   obtaining a set of lists of items, each list comprising a set of items needed to produce a product;
   determining by computer those lists for which all the items on a list are available in inventory, and
   reporting products that have an associated list which can be filled from available inventory.

2. The method of claim 1 including scanning an item using a bar code scanner.

3. The method of claim 1 including reporting products by accessing the computer system from a remote location.

4. The method of claim 1 including obtaining a list from the internet which list can be filled from available inventory.

5. The method of claim 1 including preparing inventory of food items, selecting a group of recipes and determining whether any of the recipes call for food items that are available in inventory.

6. The method of claim 1 wherein reporting further comprises
   reporting products that have an associated list which can be partially filled from available inventory, and
   reporting items needed to complete a partially filled list.

7. The method of claim 1 further comprising selecting a subset of said set of lists, and comparing said inventory to said subset.

8. The method of claim 1, wherein preparing an inventory includes compiling an inventory of foodsuffs, and obtaining a set of lists includes obtaining a plurality of recipes and determining includes determining those recipes for which all the items in the recipe are available in inventory.

9. The method of claim 8 wherein said determining step involves accessing the computer remotely.

10. The method of claim 1 further comprising:
    adding new items to an inventory maintained in a computer system;
    deleting used items from the inventory; and
    providing an indication when the inventory reaches a predetermined level.

11. The method of claim 10 including providing the indication when the inventory is depleted.

12. The method of claim 10 including scanning an item using a bar code scanner.

13. The method of claim 12 including adding an item to inventory when the scanned item is not already contained in the inventory and deleting the item from inventory when the scanned item is already contained in inventory.

14. An article comprising a machine readable storage medium that stores instructions that cause a computer to:
  prepare an inventory;
  obtain a set of lists of items, each list comprising a set of items needed to produce a product;
  determine whether all the items on one of the lists are available in inventory, and
  report products that have an associated list which can be filled from available inventory.

15. The article of claim 14 wherein instructions are stored that cause a computer to:
  add new items to inventory;
  delete used items from inventory; and
  provide an indication when the inventory reaches a predetermined level.

* * * * *

UNITED STATES PATENT AND TRADEMARK OFFICE
CERTIFICATE OF CORRECTION

PATENT NO. : 6,188,991
DATED : February 13, 2001
INVENTOR(S) : MICHAEL ROSENZWEIG and REZAUR RAHMAN It is certified that error appears in the above-identified patent and that said Letters Patent is hereby corrected as shown below:

On title page:

In (75) Inventors, "Michael Rosenweig" should be --Michael Rosenzweig--

Signed and Sealed this

Fifth Day of June, 2001

*Attest:*

NICHOLAS P. GODICI

*Attesting Officer*

*Acting Director of the United States Patent and Trademark Office*